J. Blackadder.
Fare Box.
Nº 69,166.  Patented Sept. 24, 1867.
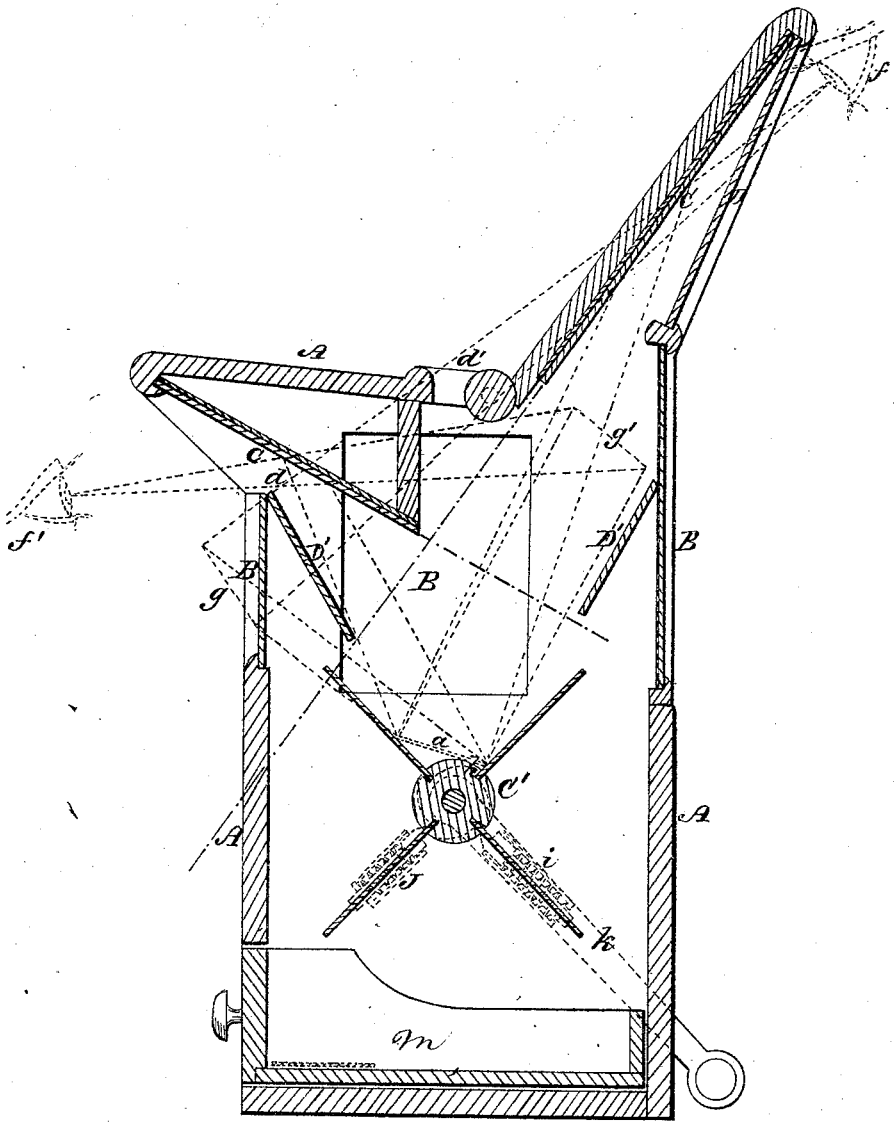
Witnesses.
Theo Tusche
Wm Teuen
Inventor.
J. Blackadder
Per Munn & Co.
Attorneys.

UNITED STATES PATENT OFFICE.

JOHN BLACKADDER, OF NEW ORLEANS, LOUISIANA.

IMPROVEMENT IN CITY-CAR AND OMNIBUS FARE-BOX.

Specification forming part of Letters Patent No. 69,166, dated September 24, 1867.

*To all whom it may concern:*

Be it known that I, JOHN BLACKADDER, of New Orleans, in the parish of Orleans and State of Louisiana, have invented a new and useful Improvement in City-Car or Omnibus Money-Box; and I do hereby declare that the following is a full, clear, and exact description thereof, which will enable others skilled in the art to make and use the same, reference being had to the accompanying drawing, forming part of this specification.

This invention consists in arranging reflectors in a city-car money-box in such a manner that the fare deposited can be seen by the passengers and by the driver, and also in arranging a wheel so that the fare deposited can be deposited in a drawer by the driver, as will hereinafter be described.

The drawing represents a vertical section of the box, showing the arrangement of the reflectors, and also of the revolving wheel.

A represents the box, which may be made of wood, or any other suitable material. B represents ground or stained glass, which is sufficiently transparent to admit the necessary light. C represents reflectors, which may be of either glass or metal. C' represents the wheel. D represents common transparent glass. The two pieces D' are the same, or common glass, which serve as guides to conduct the ticket or money onto the wheel. The ticket or money will always lodge between the wings of the wheel, as seen at $a$, whether dropped into the box at $d$ or $d'$; but the reflectors are so placed, and the refraction of the rays of light is such, that when the driver of the car looks into the box, as at $f$, he will see the ticket as though it were at the point $g$, while a passenger in the car, looking from $f'$, would see the ticket as though it were at the point $g'$. The wheel is formed of a shaft, which passes through the width of the box. There are four wings upon it, as seen in the drawing. Upon one end of the shaft there is a ratchet-wheel, $h$, with four notches, and outside of the ratchet there is a lever, marked $k$, which turns loosely on the end of the shaft. The lever has a pawl attached to it, which is pressed toward the ratchet by a spring, $i$. The wheel is revolved by this pawl on the lever acting upon the ratchet. An up-and-down motion of the lever turns the wheel one-quarter of a revolution. When thus turned the wheel is held in position by an independent spring-catch, seen at J. The lever of the wheel C' is always to be within reach of the driver, so that he can turn the wheel, and thereby drop the fare into the drawer beneath. $m$ represents the drawer.

I do not confine myself to this particular method of turning the wheel or holding it. I am aware that it can be done otherwise.

Having thus described my invention, what I claim as new, and desire to secure by Letters Patent, is—

1. The reflectors C, combined with a money-receiving box of a car or carriage, arranged substantially as and for the purposes set forth, or so that the deposited ticket or money, or a representation thereof, can be seen by both driver and passenger.

2. In combination with the above, the glass windows B, glass guides D and D', and wheel C', arranged as described, for the purpose specified.

JOHN BLACKADDER.

Witnesses:
WM. H. STEHLE,
ALEXR. TODD.